United States Patent [19]

Bond et al.

[11] B 3,924,591

[45] Dec. 9, 1975

[54] QUICK WARM-UP INTAKE MANIFOLD

[75] Inventors: William D. Bond, Warren; Bruce E. Zemke, Birmingham, both of Mich.

[73] Assignee: General Motors Corporation, Detroit, Mich.

[22] Filed: Sept. 4, 1973

[21] Appl. No.: 394,188

[44] Published under the Trial Voluntary Protest Program on January 28, 1975 as document no. B 394,188.

[52] U.S. Cl. .......................... 123/122 H; 123/122 AB; 123/122 AC; 123/133
[51] Int. Cl.² ........................................ F02M 31/00
[58] Field of Search ............ 123/122 H, 133, 122 A, 123/122 AC, 52 MV, 122 AB

[56] References Cited
UNITED STATES PATENTS

| | | | |
|---|---|---|---|
| 2,603,199 | 7/1952 | Moseley | 123/122 H |
| 2,989,956 | 6/1961 | Drinkard | 123/122 H |
| 3,732,696 | 5/1973 | Marahi | 123/122 H |
| 3,814,071 | 6/1974 | Buchwald | 123/122 H |

*Primary Examiner*—Charles J. Myhre
*Assistant Examiner*—R. H. Lazarus
*Attorney, Agent, or Firm*—J. C. Evans

[57] ABSTRACT

A temperature control system for an intake manifold stove to vaporize fuel droplets during a cold enrichment mode of carburetor operation; said system including a heat riser valve operated in accordance with engine coolant temperature by means of a thermal vacuum valve operatively connected to a vacuum operator coupled to the heat riser valve. A standard carburetor choke pull diaphragm opens the choke on engine start and a secondary choke includes means to produce a time variable control of further choke opening within a quick release time period; the vacuum valve responds to a coolant temperature at which liquid fuel droplets will be vaporized by the intake manifold wall temperature to cut-off heat to the stove after the choke is fully opened.

4 Claims, 7 Drawing Figures

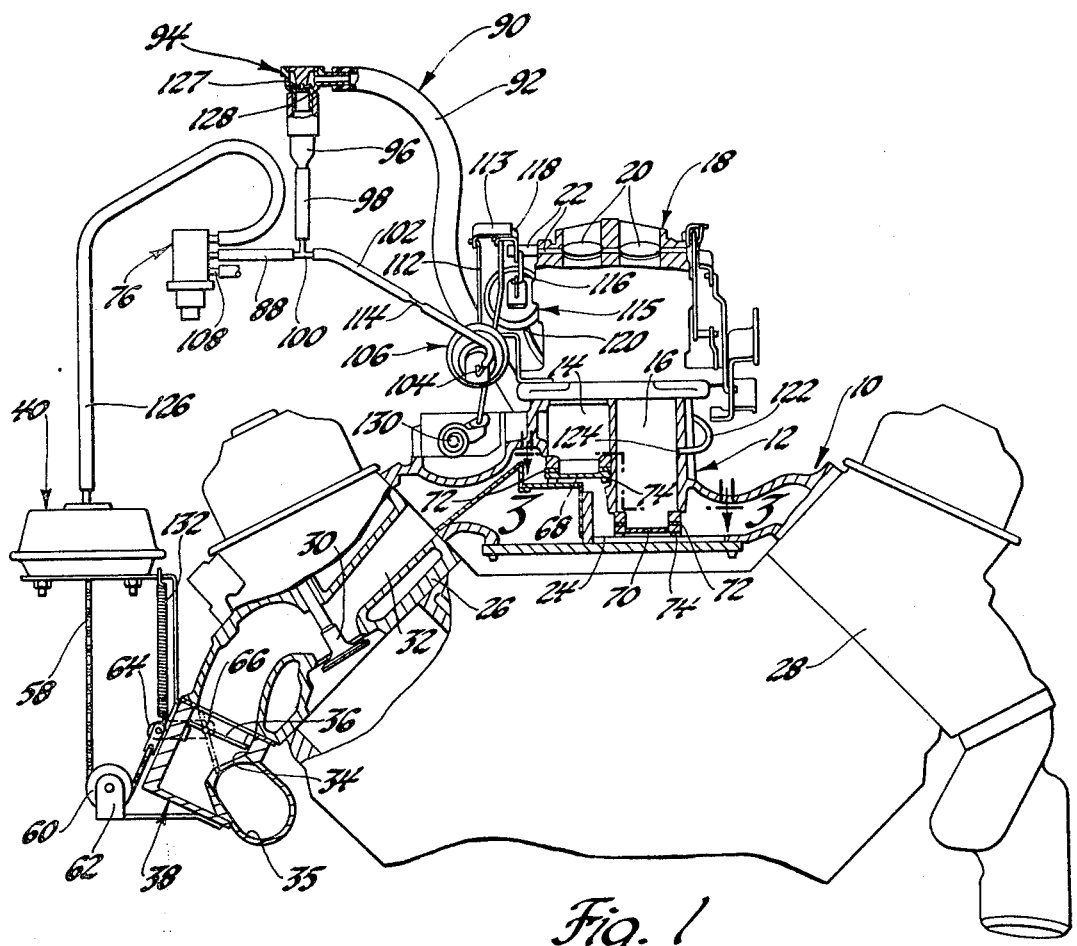
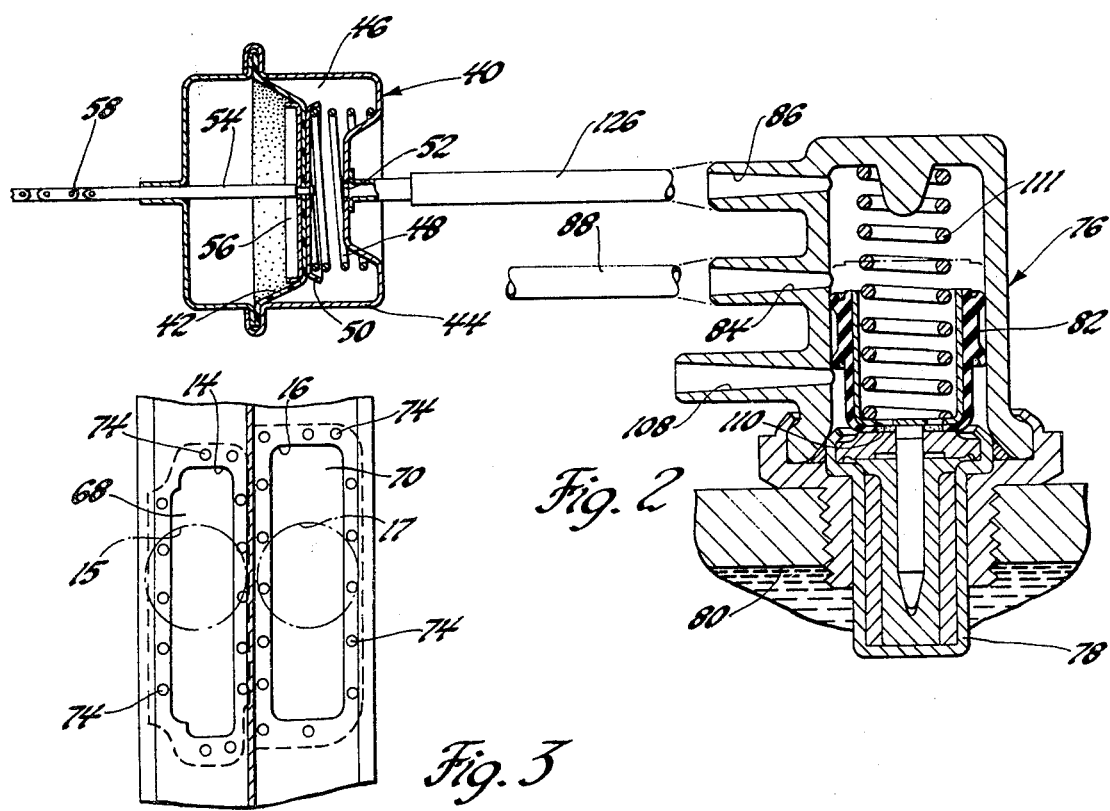
Fig. 1
Fig. 2
Fig. 3

QUICK WARM-UP INTAKE MANIFOLD

This invention relates to intake manifolds of the type including a hot spot or stove heated by exhaust gases from the engine and more particularly to a system for controlling exhaust heat flow to the stove so as to evaporate fuel droplets during a cold enrichment phase of operation and to terminate exhaust heat of the manifold to prevent undesirable heating of the entire air-fuel mixture following opening of an engine choke.

Heated intake manifolds have included a thermostatically controlled heat valve in the exhaust system to direct exhaust gas to a hot spot when the engine is cold. In such systems, it is desirable to have a heating surface which is of low thermal mass to produce a quick heat-up of the stove or hot spot so as to quickly vaporize any liquid droplets that might be directed thereagainst through the intake manifold passageways during periods where the carburetor is set for a cold enrichment phase of operation.

Such intake manifold heating systems preferably are designed to evaporate any liquid fuel without appreciably heating the air-fuel mixture passing to the intake valves of the engine.

An object of the present invention is to control the exhaust heat to a hot spot in an intake manifold by means of a heat riser valve under the control of a vaacuum operator which is conditioned to maintain the heat valve positioned to direct exhaust gas to the hot spot during a cold enrichment phase of carburetor operation with the choke set at a break position immediately after start and set in a fully open position following a quick open phase of operation; the hot spot serving to vaporize fuel collected on the hot spot during cold enrichment operation; the vacuum operator being controlled by a thermal vacuum switch which responds to a coolant temperature reflecting an increase in temperature in the intake manifold walls capable of evaporating fuel droplets prior to passage thereof into the intake valves so as to condition the heat valve to direct exhaust gas directly into an exhaust manifold thereby to prevent excessive heating of the fuel-air mixture following cold enrichment operation.

Yet another object of the present invention is to improve fuel supply to the intake valves of an internal combustion engine by means of an intake manifold having induction passageways therein supplied with an air-fuel mixture from a carburetor having a choke maintained closed by a standard choke bimetal operator prior to start and positioned in a break position immediately after start and wherein time release means are included to open the choke from the vacuum break position to a fully opened position during a cold enrichment phase of carburetor operation; an exhaust heated stove located in the intake manifold evaporates liquid fuel droplets supplied from the carburetor during the cold enrichment phase of operation during which a heat valve is positioned to direct exhaust heat to the stove; the heat valve being controlled by means including a thermal vacuum switch in accordance with coolant temperature to prevent exhaust flow against the stove when the walls of the intake manifold are at a predetermined temperature to vaporize liquid fuel after the choke is fully opened.

Further objects and advantages of the present invention will be apparent from the following description, reference being had to the accompanying drawings wherein a preferred embodiment of the present invention is clearly shown.

In the Drawings:

FIG. 1 is a view in vertical section of a heated intake manifold and fuel supply system including the present invention;

FIG. 2 is an enlarged fragmentary sectional view of a thermal vacuum switch and heat valve in the system of FIG. 1;

FIG. 3 is a horizontal sectional view taken along the line 3—3 of FIG. 1 looking in the direction of the arrows;

Figure 4:
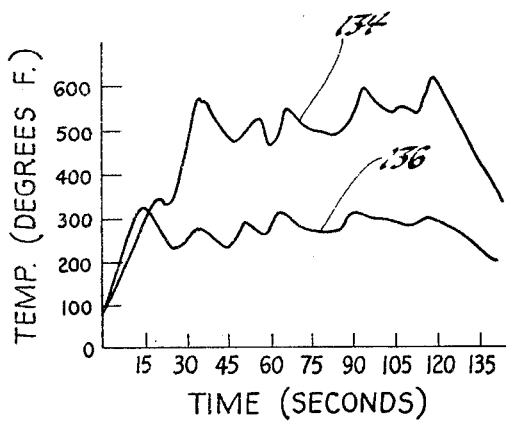
FIG. 4 is a graph showing the heat exchanger temperature for different periods of operation of the heat riser valve in the system of FIG. 1.

Referring now to the drawings in FIG. 1, an engine 10 is illustrated including an intake manifold 12 having a pair of dual level intake passages 14, 16 therein. Each of the intake passages 14, 16 are in communication with bores 15, 17 of a carburetor assembly 18. The carburetor assembly 18 includes choke plates 20 operated by a shaft 22.

The intake manifold 12 includes a crossover passage 24 therein which communicates between an exhaust manifold 26 on one bank of cylinders of an eight-cylinder engine and an exhaust manifold 28 on the opposite side thereof. Within the exhaust manifolds 26, 28 are located a plurality of exhaust valves 30, one of which is illustrated in FIG. 1. The exhaust manifold 26 includes a passage 32 from the exhaust valve 30 for communicating the cylinders of the exhaust manifold bank 26 either with the crossover passage 24 or with a manifold exhaust passage 34 to an exhaust pipe 35. A valve plate 36 of a heat riser valve assembly 38 is located within the exhaust passage 34 and is operable between a closed position which is shown in solid line and an open dotted line position under the control of a vacuum operator 40 which includes a diaphragm 42 within a housing 44 to define a vacuum enclosure 46 on one side thereof. Within the vacuum enclosure is located a bias spring 48 that is in engagement with a support plate 50 at one end thereof and has the opposite end thereof in engagement with the housing 44 around a vacuum port 52 therein. An operator shaft 54 has one end thereof connected to a diaphragm support plate 56 and the opposite end thereof connected to a chain 58 that is directed around a pulley 60 connected by means of a bracket 62 to the housing of assembly 38. The end of the chain 58 is connected to one end of a lever 64 which has the opposite end thereof connected to a valve plate shaft 66 directed through the valve plate 36 in offset relationship to the centerline thereof whereby pressure differentials across the closed valve plate will cause the valve plate 36 to move from the illustrated closed position to its open position. This prevents excessive exhaust gas back pressure in crossover passage 24 under high engine load conditions.

The two level passages 14, 16 in the intake manifold 12 have thin steel plates 68, 70, respectively, secured in the floor thereof. Each plate has a peripheral seal gasket 72 thereon held against manifold 12 by a plurality of screws 74. The plates 68, 70 are placed closely adjacent the floor of the passage 24 to define a constricted flow path therebetween whereby exhaust flow therethrough will scrub the bottom of each of the plates 68, 70 to raise the temperature thereof.

Additionally, each of the plates 68, 70 are located below carburetor bores 15, 17 so that they will serve to collect fuel droplets and transfer exhaust gas energy to vaporize any fuel droplets thereon in a manner to minimize required choke time.

The control system of the present invention further includes a thermal vacuum switch 76 having a thermostatic actuator 78 thereon located within an engine coolant passage 80. The thermal vacuum switch includes a slide valve 82 that is shifted by the actuator 78 between a cold and a warm position.

When the coolant is below a predetermined temperature, as for example, when the engine is operating cold, the actuator 78 will position the slide valve 76 so as to open communication between a vacuum inlet port 84 on the switch 76 and a vacuum outlet port 86 thereon. The vacuum inlet port 84 is connected to a vacuum line 88 which leads to a manifold vacuum system 90 including a hose 92 having one end thereof connected to an intake vacuum manifold port (not shown) and the opposite end thereof connected to a vacuum hold check valve 94 that has the outlet 96 thereof connected by a line 98 to a tee fitting 100. One leg of the tee 100 is connected to one end of the vacuum line 88. The opposite leg of the tee 100 is connected to a line 102 leading to a signal port 104 of a quick pull choke assembly 106.

The thermal vacuum switch 76 also includes an atmospheric port 108 and a valve port 110 that communicate with port 86 when the coolant temperature exceeds a predetermined temperature causing actuator 78 to move valve 82 into a dotted line position against a bias spring 111 of switch 76. When the switch 76 is so conditioned, it reflects an increase in the engine temperature that will produce an intake manifold wall temperature in the region of the passages 14, 16 to vaporize fuel particles flowing from the carburetor 18 to the intake valves of the engine following the cold enrichment phase of operation. The aforedescribed description of valve 76 suffices for purposes of the present invention. A detailed description of a thermal device of the type shown at 76 is more particularly set forth in U.S. Pat. No. 3,503,377, issued Mar. 31, 1970.

The quick pull choke assembly 106 includes an actuator arm 112 that is coupled to a shaft lever 113 so as to cause rotation of the choke plates 20 between a break position and a full open position. The control of the quick pull choke 106 is timed variable as established by an orifice 114 formed in the vacuum line 102.

Additionally, the choke 20 is operated by a standard choke pull vacuum operator 115 that includes an operator arm 116 connected to a lever 118 thence to the choke shaft 22. The standard choke pull diaphragm includes a vacuum signal port 120 connected by a line 122 to an intake vacuum port 124 in the carburetor 18.

The aforedescribed system operates between a cold start mode of operation wherein the carburetor 18 has the choke plates 20 thereof positioned between a closed and a break point position which is produced immediately after start. At a cold start position, for exampale, one which occurs in the 70°F. ambient state, the intake manifold walls will be at a 70°F. level. Additionally, in order to start the engine cold, an enrichment of the air-fuel ratio is produced by maintaining the choke plates 20 closed as the engine is started. This will cause a substantial intake manifold vacuum to draw a substantial fuel supply into the engine for start purposes. This fuel will collect as droplets on each of the thin hot plates 68, 70 which serve as stoves to vaporize the fuel prior to passage thereof to the intake valves and engine cylinders.

In accordance with certain principles of the present invention, to minimize exhaust emissions during the start, cold enrichment phase of operation, the thermal vacuum switch 76 has the actuator 78 thereof conditioned by the coolant temperatures 80 to cause intake manifold vacuum to be directed between the vacuum inlet port 84 and the vacuum outlet port 86 through a vacuum line 126 which is connected to the vacuum port 52 of the operator 40. This will reduce the pressure within the vacuum enclosure 46 to cause the diaphragm 42 to compress the bias spring 48 thereby to cause the shaft 54 to move inwardly of the housing 44 to thereby move the heat valve plate 36 into the solid line closed position within the exhaust passage 34 of the heat valve assembly 38.

This will cause engine exhaust to be directed through the crossover heat passage 24, and a constricted space between the under surface of plates 68, 70, thence through the exhaust manifold 28 to the engine exhaust pipe. The thermal mass of the plates 68, 70 is selected so that when the heating surfaces are initially at 70°F. under cold start condition, they will reach a temperature in the order of 270°F. at the end of a twenty second idle period in order to produce smooth engine acceleration when the choke is off. The system is designed to evaporate the liquid fuel accumulated on plates 68, 70 without appreciably heating the air-fuel ratio flowing through the passages 14, 16. In order to accomplish this, the vacuum operator 40 is controlled in response to engine coolant temperature to open the heat valve 38 and thereby communicate the exhaust valves 30 of the exhaust manifold bank 26 with the exhaust passageway 34 to reduce the exhaust energy heating of the plates 68, 70 following the cold enrichment phase of operation. Thus, the energy transferred to the plate 68, 70 is maintained for a time period that will cause the plates 68, 70 to evaporate any accumulation of liquid fuel particles thereon during the fuel enrichment phases of operation. Thereafter, the heat flow against the exhaust side of the plates 68, 70 is reduced so as to minimize heat transfer to the inlet air-fuel mixture.

At vehicle start, the choke plates 20 are closed to produce a maximum fuel enrichment. As soon as the vehicle engine starts, the intake manifold pressure at port 124 will be reduced to cause the vacuum operator choke pull assembly 115 to position the choke open to a break point position. At this point, there will still be a substantial intake manifold vacuum that will continue to produce cold enrichment flow of fuel into the intake manifold 12. Concurrently, the plates 68, 70 will be heated by exhaust flow through passage 24 to evaporate fuel droplets being directed thereagainst so as to produce low cold start hydrocarbon emissions.

With an effective early fuel evaporation action as provided by the plates 68, 70 the choke plates 20 can be positioned fully open in a relatively short period of time, for example, within 5 to 10 seconds after a start at 70°F.

In accordance with the present invention, intake manifold vacuum is applied to both the quick pull choke 106 and the standard choke pull operator 115. The standard operator 115 is a conventional vacuum break unit that pulls the choke open to a break point immediately after the engine starts. The other quick start diaphragm or vacuum operator 106, by virtue of the restriction 114, will control opening of the choke so that five to ten seconds is required for the quick pull choke 106 to pull the choke plates 20 into an open position. In the illustrated embodiment, manifold vacuum is supplied to the vacuum operator 40 and the secondary quick pull choke 106 across check valve 94. the check valve 94 is normally open when the intake manifold vacuum pressure is below a predetermined level which is adequate to power the vacuum operators. If the intake manifold pressure rises excessively, the valve 94 closes to maintain vacuum on the operator 40 and pull choke 106.

A normal exhaust heated bimetal coil 130 for controlling choke positions continues to move after the choke is fully open by the quick pull choke operator 106. Thus, it removes fast idle and unlocks the secondary throttle of the carburetor in about 90 seconds at 70°F. Such a bimetal is a very active bimetal as compared to present production coils.

As long as the heat valve 36 is closed, the exhaust energy will maintain the plates 68, 70 at an elevated temperature that is capable of evaporating fuel droplets prior to passage thereof into colder sections of the intake manifold.

Following a predetermined period of time, however, the mass of the intake manifold 12 will increase in temperature. For example, on one working embodiment, the walls of the intake manifold 12, initially are at ambient temperature in the order of 70°F. and the hot spots represented by the plates 68, 70 are in the order of 400°F. The walls of the intake manifold increase in temperature because of engine operation to eventually reach a temperature that will be adequate to vaporize fuel. The coolant temperature is raised to a temperature in the order of 90° – 100°F. following 60 to 90 seconds of engine operation from a 70°F. cold start. The plate temperature reaches 270°F. in 20 seconds at idle and should not exceed 400°F. operating temperature. At this thermal level, the thermal vacuum switch actuator 78 expands to shift the slide valve 82 into a position to connect the atmospheric port 108 with the outlet 86 therefrom.

Under these conditions, the vacuum enclosure 46 increases in pressure and will no longer bias the diaphragm 42 against the spring 48. As a result, the shaft 54 is moved outwardly of the vacuum operator housing 44 to cause the chain 58 to be spring biased by a return spring 132 connected between lever 64 and operator 40 thereby to cause rotation of the lever 64 and movement of the valve 36 into its open position, shown in dotted lines in FIG. 1.

By virtue of this arrangement, the exhaust heat input to the passages 14, 16 of the intake manifold 12 is proportioned to produce a greater exhaust heat thermal input therein during the cold enrichment phases of operation as more fuel is drawn into the intake manifold when the choke is closed or partially closed. The cold enrichment is characterized by the presence of fuel droplets in the air-fuel mixture which are evaporated by the exhaust heat input through the plates 68, 70. In order to avoid excessive temperature increase of the air-fuel mixture, following the cold enrichment period of operation, the system uses the coolant sensing system to positively actuate the heat valve to an open position thereby to reduce the flow of exhaust flow through the restricted heat crossover passage 24 once the cold enrichment phase of operation is completed.

In the illustrated arrangement, the switch point occurs approximately one minute after the choke has fully opened. The fact that the fuel is vaporized between a closed choke position and an open position assures that a good combustible mixture will flow to the engine cylinders to maintain drivability under cold start conditions while enabling the choke to be quickly opened thereby to reduce excessive flow of fuel into the engine to reduce hydrocarbon and CO emissions therefrom.

Following the ninety second period required to open the heat riser valve 36, the intake manifold walls at the passages 14, 16 therethrough have been raised to an elevated temperature which is sufficient to vaporize fuel particles passing therethrough into the intake valve of the engine so as to maintain good drivability and emission control following this phase of operation.

Once the heat riser valve 36 is opened, exhaust is no longer forced through the heat passage 24 in the intake manifold. However, a certain amount of exhaust flow pulses through the heat passage as each cylinder of the engine fires to cause a limited amount of heating of each of the plates 68, 70. The pulsing gas flow with the heat passage should be restricted to prevent overheating the plates 68, 70. In one working embodiment, the flow path beneath the plate of the engine was in the order of about 0.2 square inches. This produced good exhaust heat transfer through plates 68, 70 with four cylinder heat when the valve plate 36 is closed while producing sufficient restriction to prevent the plates from excessively heating the air flow ratio during open operation of the valve where only pulses of exhaust flow through the heat passage 24.

The graph of FIG. 4 illustrates the effect of early fuel evaporation time on the heat exchanger temperature for two different times. For a time period of operation of the heat riser valve of 120 seconds a plate temperature shown by curve 134 results that is higher than a desired temperature. With a fifteen second period of heat, shown by curve 136, the plate temperature is lower than the desired temperatures. The valve plate 36 will blow open upon excessive engine loads. This will tend to lower the peaks of the upper curve which are produced in response to high load operation. Once this occurs, the curve closely approaches the desired operating temperature of approximately 400°F. during the cold enrichment phase of operation.

Figure 5:
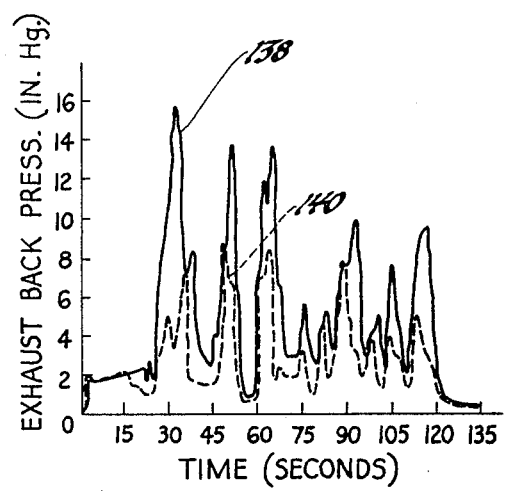
FIG. 5 is a graph showing the exhaust back pressure for different periods of operation of the heat riser valve in the system of FIG. 1.

FIG. 5 shows the exhaust system back pressure in curve 138 that is present with a hundred-and-twenty-second operation of the heat valve 36. Curve 140 shows back pressure under fifteen-second operation of valve 36.

Figure 6:
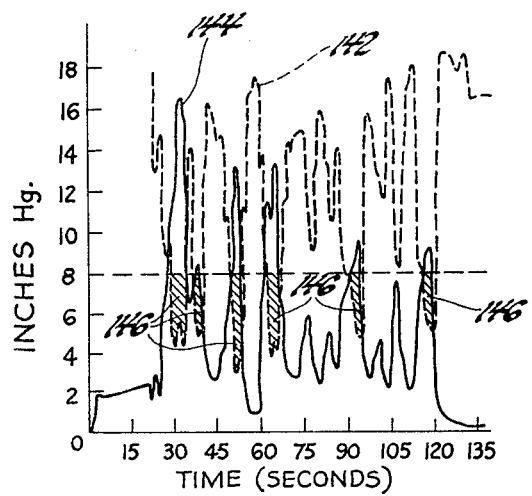
FIG. 6 is a graph showing exhaust back pressure and intake manifold vacuum relationships to produce blow-off of the heat riser valve in the system of FIG. 1.

FIG. 6 illustrates how manifold vacuum curve 142 is used to signal the blow open function of valve 36. At peak, back pressures shown in curve 144 and low intake manifold pressures, curve 142, the valve 36 blows open for a time period as shown in hatched line curve segments 146 to eliminate back pressure spikes in the system.

Figure 7:
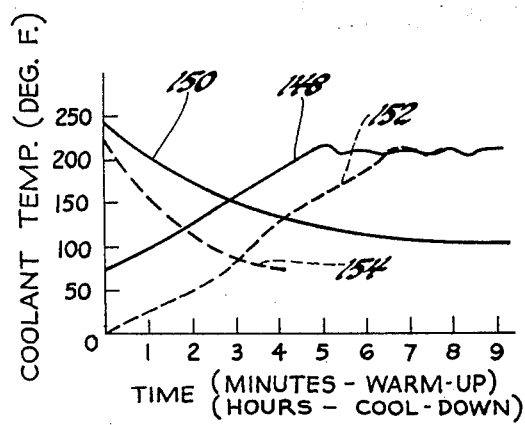
FIG. 7 is a graph showing engine coolant characteristics in a system utilizing the present invention.

An estimate of typical times for operating the heat valve 36 closed and cold soak requirements for the vehicle can be made by observing the engine coolant warm up and cool down characteristics as shown in FIG. 7. Curve 148 is coolant heat up at 75°F. ambient and curve 150 represents coolant cool down at 75°F. ambient, curves 152, 154 represent coolant heat-up and cool down, respectively at 0°F. ambient. A 100°F. switch point of operation of the thermal vacuum switch 76 will result in 80 seconds of direct exhaust flow past the hot spots 68, 70 for a 75°F. ambient start. The time period will be approximately 3 minutes and 10 seconds for 0°F. ambient start before the heat valve will open. The cool down characteristics as shown in FIG. 7 demonstrate that approximately a 9-hour soak in 75°F. ambient and approximately a 2-hour soak at 0°F. ambient are required to obtain closure of the heat valve once the engine has been warmed up in a manner to cause the valve to open.

The system including the combination of the coolant controlled heat riser valve and the fast opening choke system helps heated manifolds to reduce carbon monoxide emission while maintaining good drivability. The system enables an engine to run cleaner with less fuel since liquid fuel droplets are vaporized to a greater extent under cold enrichment start conditions and to a reduced extent as the engine warms up but in either case being vaporized to present a fuel flow into the intake valves of a vehicle so as to maintain drivability therein while reducing the fuel intake by use of a quick choke pull mechanism.

While the embodiments of the present invention, as herein disclosed, constitute a preferred form, it is to be understood that other forms might be adopted.

What is claimed is as follows:

1. A fuel supply system for an internal combustion engine of the type including an intake manifold having a cross-over passageway therein including a thin plate stove exposed on one surface thereof to air-fuel flow to the intake manifold and to exhaust flow on the opposite surface thereof through the cross-over passageway, the improvement comprising: vacuum actuated heat riser valve means having an opened and a closed position, a thermally responsive vacuum control device having means sensing the engine coolant temperature and valve means responsive thereto to selectively direct vacuum to the vacuum actuated heat valve means below a predetermined coolant temperature for maintaining it in its closed position to divert exhaust flow through the crossover passageway during an early fuel evaporation phase of control and operative above the predetermined coolant temperature to direct atmospheric pressure to the heat valve means to open the heat riser valve means to reduce exhaust flow through the crossover passage following the early fuel evaporation phase of operation, a carburetor including a choke for supplying an air-fuel mixture to the intake manifold, means including a vacuum operator to pull the choke open to a start position immediately after the engine has started, and means for continuing opening of the choke at a reduced rate from the start position to a full open position following a predetermined time period, said vacuum operated heat riser valve means maintaining heat flow to the stove during the choke opening period and for a period thereafter to assure vaporization of liquid fuel droplets flowing from the carburetor against the stove, said thermally responsive vacuum control device conditioning said heat riser valve means upon a predetermined increase in engine coolant temperature to open said riser valve means to prevent the heating of the stove and air-fuel flow into the engine once the engine is at a predetermined temperature as reflected by the predetermined increase in engine coolant temperature.

2. A fuel control system for an internal combustion engine including an intake manifold having a crossover exhaust passageway therein and a thin plate stove therebetween heated by exhaust flow through the crossover passageway to evaporate liquid fuel droplets accumulated on the stove comprising: means including a heat riser valve for diverting engine exhaust through the crossover passage, first vacuum operator means for operating said heat riser valve between first and second positions, a thermal vacuum controller including means for sensing engine coolant temperature and means operative in response to changes in coolant temperature to selectively connect said first vacuum operator with atmosphere and a source of vacuum to move said heat riser valve between its first and second positions, a carburetor for supplying fuel to the intake manifold including a choke having a closed position, a start position and a fully opened position, second vacuum operator means connected to said choke responsive to the intake manifold pressure at engine start to position said choke in its start position to cause an enriched air-fuel mixture into the intake manifold, and means including third vacuum operator means for operating said choke into its fully opened position a predetermined time period after engine start to reduce the fuel enrichment, said thermal vacuum controller being operative when engine coolant is below a predetermined temperature to connect said first vacuum operator means with a source of vacuum to cause said heat riser valve to direct exhaust through the crossover passageway to produce a transfer of heat through the thin plate stove to evaporate liquid fuel droplets during the enriched phase of choke operation, said first diaphragm operator means being conditioned by said thermal vacuum controller to control the heat riser valve to continue exhaust heat flow to the stove following positioning of the choke plate in its fully opened position, said thermal vacuum controller being operative when a predetermined temperature occurs in the engine coolant to condition said first vacuum operator means and said heat riser valve to terminate exhaust flow through the crossover passageway thereby to prevent excessive heating of the air-fuel mixture into the intake manifold following the fuel enrichment period of choke operation.

3. A fuel supply system for an internal combustion engine of the type including an intake manifold having a cross-over passageway therein for the flow of exhaust heat from the engine and including a heat transfer plate between the crossover passageway and the intake manifold to evaporate liquid fuel droplets flowing into the intake manifold from a carburetor, the improvement comprising: a choke in said carburetor, a first diaphragm operator for positioning said choke in a closed and a break position following start, means including a second vacuum operator connected to said choke and operative following the start of an engine to pull the choke from the vacuum break position to a full open position through a controlled time period to produce a quick opening of the choke after the engine has started, a third vacuum operator, heat riser valve means connected to said third vacuum operator, and thermal vacuum valve means including a thermally responsive element for sensing the coolant temperature of the vehicle and operative to condition said third vacuum operator to position the heat riser valve means in a heat position during a start phase of operation whereby exhaust heat is directed against the heat transfer plate for causing liquid fuel droplets thereon to evaporate, said thermal vacuum valve means being responsive to a predetermined increase in coolant temperature to position the heat riser valve means in a bypass position to cause less exhaust flow through the crossover passageway thereby to reduce the input of heat into the intake manifold to prevent excessive heating of the air-fuel mixture passing therethrough, said heat riser valve being maintained in its heat position for a time period in excess of the choke controlled time period to maintain transfer of exhaust heat to the heat transfer plate during enriched fuel phase of choke operation whereby liquid fuel particles accumulated on the heat transfer plate are subjected to early fuel evaporation to prevent excessive emissions from the engine during cold start operation of the engine.

4. A vehicle fuel supply system comprising an intake manifold having a floor, a carburetor for directing air-fuel ratio into the intake manifold downwardly against said floor, said carburetor including a choke plate, a thin metal plate in the floor of the intake manifold, means for directing exhaust gas under the plates through a constricted passage, means including a heat riser valve for opening and closing communication between the engine exhaust valves and the constricted passage, first vacuum operator means for operating the heat riser valve, thermal vacuum control means including means sensing the engine coolant temperature and means operative to condition the vacuum operator means to open the heat riser valve when the coolant reaches a predetermined temperature, second vacuum operator means in communication with intake manifold vacuum through means including a restriction for delaying operation of said second vacuum operator means, means for coupling said second vacuum operator means to the choke, said second vacuum operator being responsive to operation of the engine following engine start to open the choke during a quick response period, said thermal vacuum control means controlling vacuum to the first vacuum operator to maintain the heat riser valve conditioned to direct exhaust heat through the constricted passageway during enriched fuel operation to evaporate liquid fuel particles directed against the thin metal plate, said thermal vacuum control means being operative to apply manifold vacuum to the first vacuum operator means above a predetermined temperature following a time duration in excess of that required to position said choke in its full open position to terminate exhaust heating of the plates thereby to prevent excessive temperature increases in the air-fuel mixture to the engine following the enriched fuel phase of operation, said heat riser valve including means responsive to a low vacuum produced on full throttle positions in the intake manifold before the thermal vacuum valve senses a predetermined switchover temperature thereby to permit exhaust of gas from the engine to improved engine power and to limit manifold plate temperatures under full throttle conditions.

* * * * *